(12) United States Patent
Basso et al.

(10) Patent No.: US 7,310,811 B1
(45) Date of Patent: Dec. 18, 2007

(54) INTERACTION MODALITIES FOR MULTIMEDIA DELIVERY AND PRESENTATION

(75) Inventors: Andrea Basso, N. Long Branch, NJ (US); Erich Haratsch, Holmdel, NJ (US); Barin Geoffry Haskell, Tinton Falls, NJ (US); Joern Ostermann, Red Bank, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/113,747

(22) Filed: Jul. 10, 1998

Related U.S. Application Data

(60) Provisional application No. 60/052,576, filed on Jul. 15, 1997.

(51) Int. Cl.
*H04N 7/173* (2006.01)
*H04N 7/16* (2006.01)

(52) U.S. Cl. .................. 725/110; 725/86; 725/131; 725/151; 709/218

(58) Field of Classification Search ............... 725/86, 725/109, 110, 131; 709/231, 232, 203, 217, 709/218, 219
See application file for complete search history.

(56) References Cited

U.S. PATENT DOCUMENTS

| 5,014,125 | A | * | 5/1991 | Pocock et al. ................. 358/86 |
| 5,191,410 | A | | 3/1993 | McCalley et al. |
| 5,381,477 | A | * | 1/1995 | Beyers, II et al. ............ 380/20 |
| 5,537,408 | A | * | 7/1996 | Branstad et al. |
| 5,550,577 | A | * | 8/1996 | Berbiest et al. |
| 5,574,843 | A | | 11/1996 | Gerlach, Jr. |
| 5,673,401 | A | * | 9/1997 | Volk et al. .................. 395/327 |
| 5,794,018 | A | * | 8/1998 | Vrvilo et al. ............... 713/400 |
| 5,867,230 | A | * | 2/1999 | Wang et al. |
| 5,928,330 | A | | 7/1999 | Goetz et al. |
| 5,933,141 | A | * | 8/1999 | Smith ......................... 345/339 |
| 5,983,004 | A | * | 11/1999 | Shaw et al. ................. 709/227 |
| 6,008,836 | A | * | 12/1999 | Bruck et al. |
| 6,172,673 | B1 | * | 1/2001 | Lehtinen et al. ............ 345/327 |
| 6,233,017 | B1 | * | 5/2001 | Chaddha |
| 6,233,590 | B1 | * | 5/2001 | Shaw et al. ................. 715/500 |
| 6,295,530 | B1 | * | 9/2001 | Ritchie et al. ................. 707/4 |
| 6,349,297 | B1 | * | 2/2002 | Shaw et al. .................... 707/4 |
| 6,526,575 | B1 | * | 2/2003 | McCoy et al. ................ 725/36 |

* cited by examiner

*Primary Examiner*—Kieu-Oanh Bui

(57) ABSTRACT

A method and apparatus for displaying received data, analyze the quality of the displayed data formulating a media-parameter suggestion for the encoder to alter the characteristics of data to be sent to the receiver, and sending from the receiver, the formulated suggestion.

53 Claims, 3 Drawing Sheets

INTERACTION MODALITIES FOR MULTIMEDIA DELIVERY AND PRESENTATION

This application claims priority to Provisional Application No. 60/052,576, filed Jul. 15, 1997.

FIELD OF THE INVENTION

The present invention relates to transferring information over a network. More particularly, the present invention relates to systems and methods for improving data flow based on user preferences.

BACKGROUND OF THE INVENTION

Remote interactivity is an important issue in both multimedia research and standards development. In the known art, when an encoder transmits multimedia data to a decoder, the status of the transmission can be determined at the decoder and then fed back, through a back channel, to the encoder.

Historically, many people were convinced that using a backchannel with real-time multimedia was either impractical or impossible. The concept of a back channel is known in the art. Currently, broad status reports are sent from a receiver to a transmitter. These status reports provide very general information to the transmitter, such as whether a terminal is receiving a transmission at all. Detailed information regarding how a transmission is received, or how a transmission is displayed, is typically not fed back to the transmission source. And typically, if this information is fed back to the transmission source, the transmitter may adjust the transmission or may not, but does so without regard to the receiver's individual preferences.

SUMMARY OF THE INVENTION

The prior art lacks a meaningful way of passing suggestions from the receiver to the sender to take certain actions to improve the quality of what is displayed based on the receiver's preferences.

As a context for the present invention, but not the only context, consider a server transmitting multimedia data to a client. It would be beneficial for the client to have some way of feeding information back to the server to maximize the quality of the multimedia transmission. For example, although not the only example, if a client desires to receive multimedia data from one or more servers, and the client is also running applications that consume memory and negatively impact on the way the multimedia data is displayed, the client would benefit from being able to suggest to the server various ways to alter the transmission such that the client's display is improved. Some examples of suggestions to the server, although not the only examples, include suggestions to cut out certain transmitted frames and reduce the transmitted audio channels.

With this contextual example in mind, in one embodiment of the present invention, data is received and its quality of service is analyzed. Then, based on this analysis and on received user preferences, the receiver formulates a suggestion for the encoder to alter the characteristics of the transmitted data. Finally, the receiver transmits this suggestion to the transmitter.

DETAILED DESCRIPTION

The present invention relates to methods and systems for improving the quality of displayed data that has been transmitted over a network. For the purposes of the present invention, the word quality refers to the audio and visual characteristics of displayed data.

Figure 1:
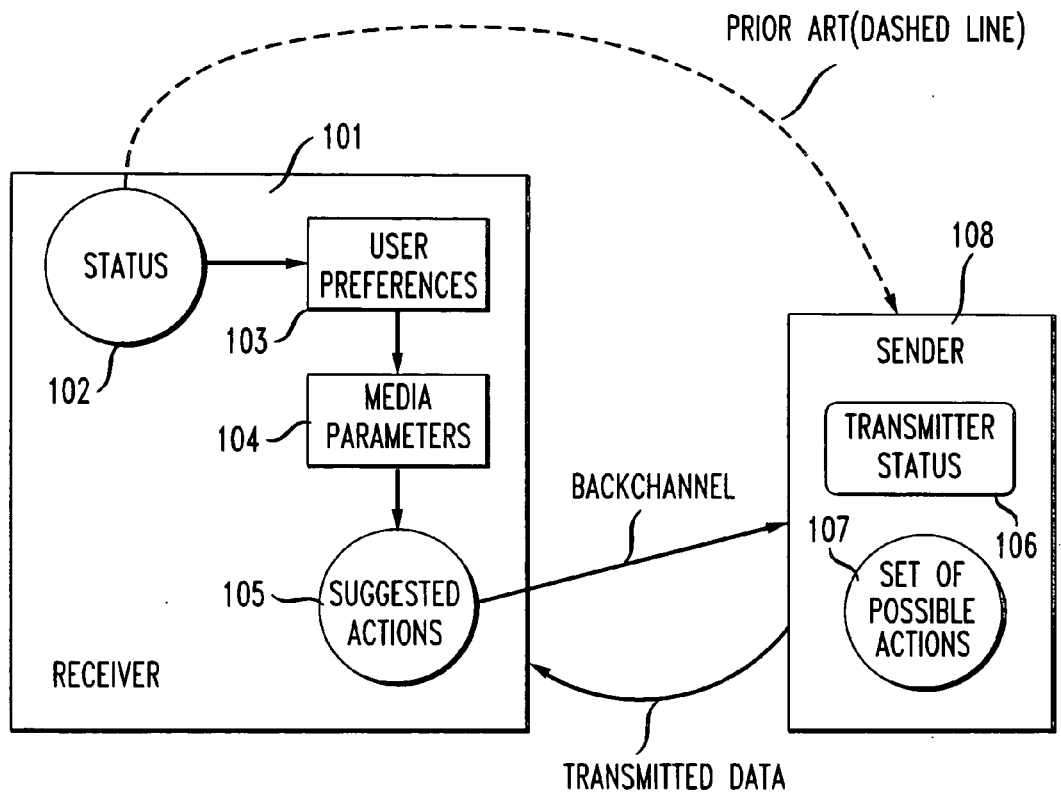
FIG. 1 is a system overview of an embodiment of the present invention.

Referring now in detail to the drawings, FIG. 1 illustrates a system overview of an embodiment of the present invention. As a context for the present invention, but not the only context, consider Sender 108 to be a multimedia data server that transmits high-quality multimedia data to a client. The client can use a backchannel to interact with the server, analyzing a set of parameters that represent the quality of the transmitted data, comparing the quality to a set of user preferences, and formulating a set of suggestions that are fed back to the server to alter the data such that the quality of the displayed data is affected.

In one embodiment of the present invention, as displayed in FIG. 1, sender 108 transmits data to a receiver 101 which then displays the data. At 102, receiver 101 analyzes the quality of the display. At 103, a set of user preferences is received, and at 104, the quality analysis is compared to the user preferences. At 105, suggested actions are formulated and fed back along the backchannel to sender 108. When sender 108 receives the suggestions, sender 108 checks its status 106 and matches its current status with a set of possible actions 107. An action is chosen and the transmitted data is altered accordingly.

Figure 2:
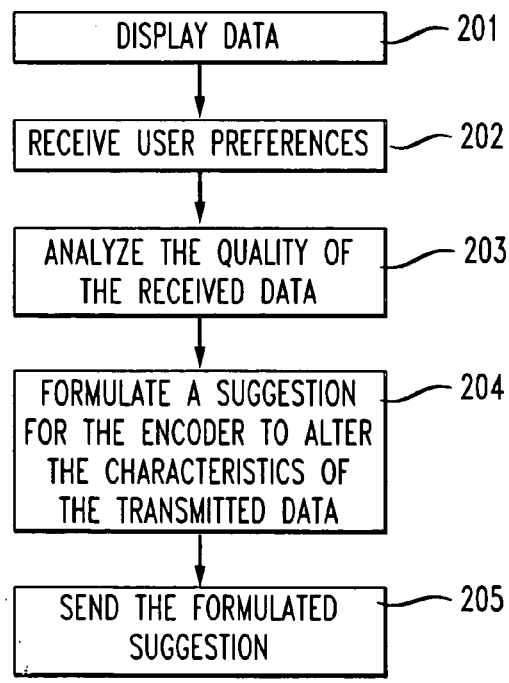
FIG. 2 is a flow chart illustrating an embodiment of a method according to the present invention.

FIG. 2 is a flow chart illustrating an embodiment of a method according to the present invention. In this embodiment, at step 201, received data is displayed at the receiver. For the purposes of this invention, the word "received" includes, but is not limited to, "created," "generated," and "selected." Therefore, the displayed data in step 201 may be received from an outside source, but it may also be, for example, internally generated. In one embodiment of the present invention, the displayed data is audiovisual, or multimedia, data.

At step 202, user preferences are received. In one embodiment of the present invention, the user preferences can specify preferences to improve the quality of the display. For example, the user preference can include data that says, in effect, "when I am busy, degrade audio, degrade video, and drop texture." In one embodiment of the present invention, the user preferences can be altered by the user during the transmission. In another embodiment of the present invention, the user preferences are fixed after the transmission begins.

At step 203, a set of parameters that represent the quality of the displayed data is analyzed. In one embodiment of the present invention, the set of parameters includes system load. For example, but not the only example, assuming a seven-bit word, zero can represent no load, and one hundred twenty seven can represent the system being completely busy. In another embodiment of the present invention, the set of parameters includes component load, where a component is chosen from the set comprising the central-processing unit (CPU), the graphics card, and the texture-mapping engine.

At step 204, a suggestion is formulated for the sender to alter the characteristics of the transmitted data. The suggestion is formulated by comparing the results of the analysis of the displayed data to the user preferences. The user preferences set some threshold for various parameters, and if the results of the analysis falls outside of that threshold, the receiver suggests to the sender to change various parameters of the transmitted data.

In one embodiment of the present invention, the formulated suggestion includes timing information identifying the point in time where the data was collected, and timing information identifying the point in time when the suggested action should be honored.

In another embodiment of the present invention, the formulated suggestion includes a suggestion to alter the rate at which frames are transmitted for display. In another embodiment of the present invention, the formulated suggestion includes altering the color depth. In another embodiment of the present invention, the formulated suggestion includes a suggestion to alter the window size. For the purposes of the present invention, "window size" means how much screen size area the scene covers. As an example, but not the only example, assume that the displayed scene covers the entire screen, but because of limited memory, the quality of the display is degraded. The formulated suggestion can include a suggestion to reduce the size of the display, thereby decreasing the need for computing power at the receiver and increasing the quality of the display.

In another embodiment of the present invention, the formulated suggestion includes a suggestion to alter audio channel characteristics. For the purposes of the present invention, the phrase "audio channel characteristics" includes bandwidth, number of audio channels, and spatial audio capabilities. As an example, but not the only example, assume that the quality of the display is degraded due to memory constraints at the receiver. The formulated suggestion can then include a suggestion that the sender decrease the number of audio channels broadcast, thereby decreasing the need for computing power at the receiver and increasing the quality of the display.

In another embodiment of the present invention, the formulated suggestion includes a suggestion to alter the graphics hardware load. For the purposes of the present invention, the phrase "graphics hardware load" includes, but is not limited to, matrix multiplication, texture mapping, and texture mapping memory.

In another embodiment of the present invention, the formulated suggestion includes a suggestion to alter the CPU load or the RAM amount available.

Figure 3:
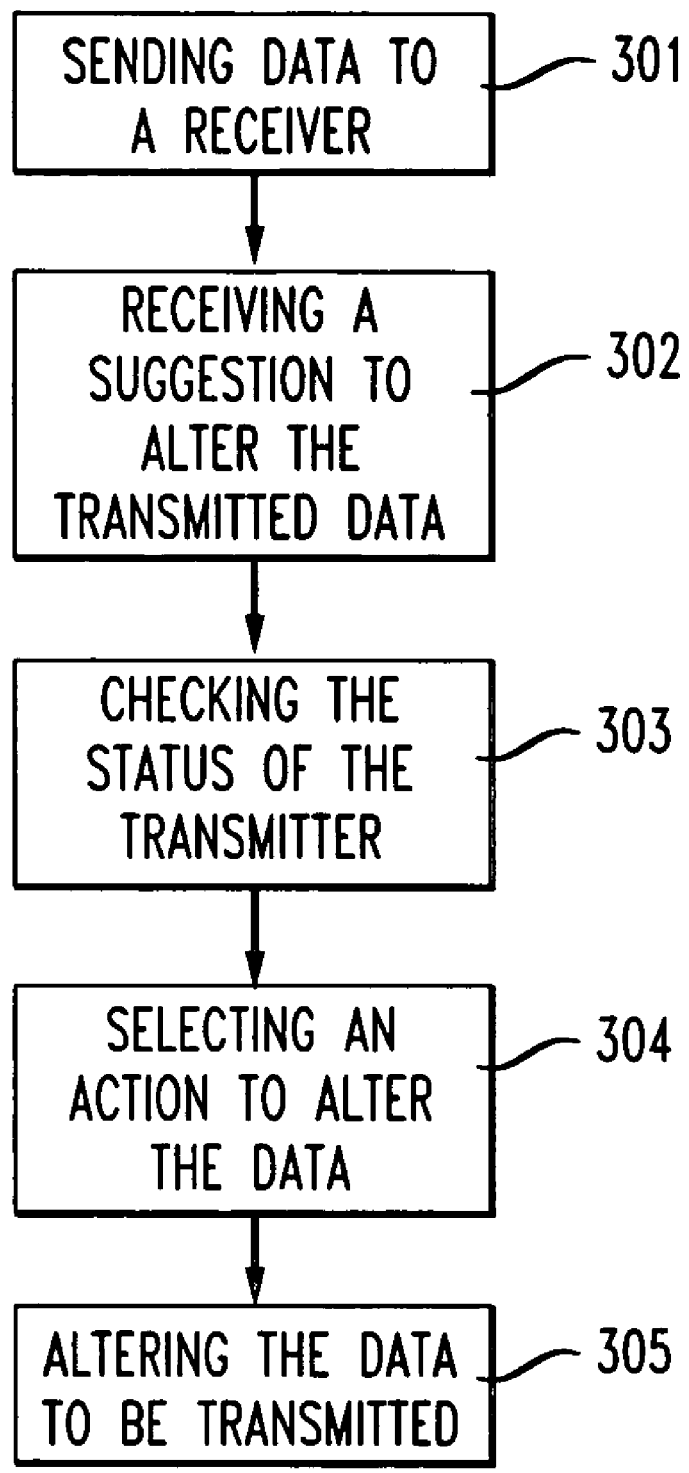
FIG. 3 is a flow chart illustrating another embodiment of a method according to the present invention.

FIG. 3 is a flow chart illustrating another embodiment of the present invention. At 301, data is sent by a sender to a receiver. In one embodiment of the present invention, the data sent at 301 is audiovisual, or multimedia data. In response to this sent data, the sender receives a suggestion at 302 to alter the transmitted data. In one embodiment of the present invention, the received suggestion includes timing information identifying the point in time where the data was collected, and timing information identifying the point in time when the suggested action should be honored.

In another embodiment of the present invention, the received suggestion includes a suggestion to alter the rate at which frames are transmitted for display. In another embodiment of the present invention, the received suggestion includes a suggestion to alter the color depth. In another embodiment of the present invention, the received suggestion includes a suggestion to alter the window size. As an example, but not the only example, assume that the displayed scene covers the entire screen, but because of limited memory, the quality of the display is degraded. The received suggestion can include a suggestion to reduce the size of the display, thereby decreasing the need for computing power at the receiver and increasing the quality of the display.

In another embodiment of the present invention, the received suggestion includes a suggestion to alter audio channel characteristics. As an example, but not the only example, assume that the quality of the display is degraded due to memory constraints at the receiver. The received suggestion can then include a suggestion that the sender decrease the number of audio channels broadcast, thereby decreasing the need for computing power at the receiver and increasing the quality of the display.

In another embodiment of the present invention, the received suggestion includes a suggestion to alter the graphics hardware load. In another embodiment of the present invention, the received suggestion includes a suggestion to alter the CPU load or the RAM amount available.

At step 303, the status is checked, and based on the current status and the received suggestion, at step 304, an action is selected from a set of actions, and the transmitted data is altered accordingly.

Figure 4:
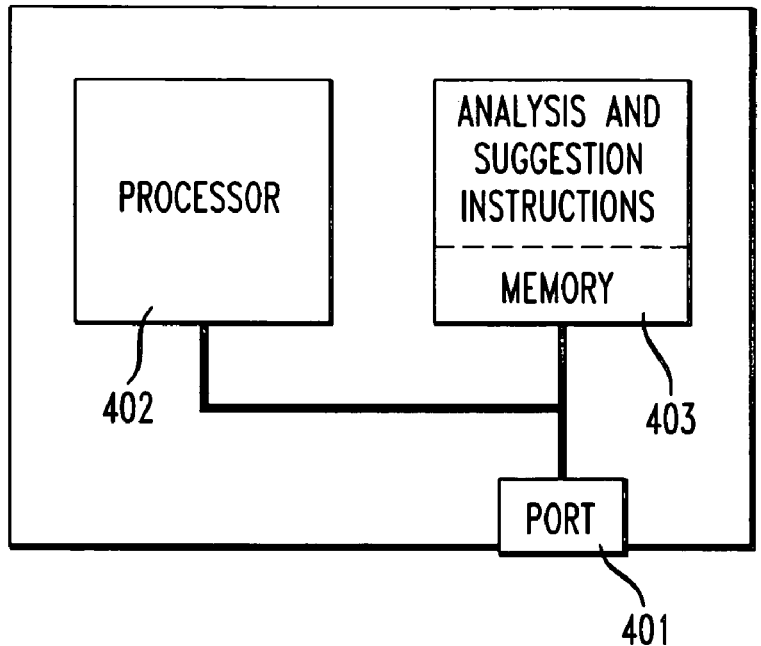
FIG. 4 is a pictorial representation of an apparatus according to one embodiment of the present invention.

FIG. 4 is a pictorial representation of an apparatus according to one embodiment of the present invention. The apparatus includes a port 401 coupled to processor 402, and memory 403, also coupled to processor 402 and to port 401. In one embodiment of the present invention, memory 403 stores instructions adapted to be executed by the processor to display received data, analyze the quality of the displayed data, formulate a suggestion for the encoder to alter the characteristics of data to be received, and then send, through port 401, the formulated suggestion to alter the quality of the received data.

For the purposes of this application, memory includes any medium capable of storing instructions adapted to be executed by a processor. Some examples of such media include, but are not limited to, floppy disks, CDROM, magnetic tape, hard drives, and any other device that can store digital information. In one embodiment, the instructions are stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor.

In one embodiment of the present invention, the memory stores instructions adapted to be run on the processor to receive a user preference to be used in the analysis. In another embodiment of the present invention, the formulated suggestion includes timing information identifying when the data was collected, and timing information identifying when the suggested action should be honored.

In another embodiment of the present invention, the formulated suggestion includes a suggestion to alter the rate at which frames are transmitted for display. In another embodiment of the present invention, the received suggestion includes a suggestion to alter the color depth. In another embodiment of the present invention, the received suggestion includes a suggestion to alter the window size. As an example, but not the only example, assume that the displayed scene covers the entire screen, but because of limited memory, the quality of the display is degraded. The formulated suggestion can include a suggestion to reduce the size of the display, thereby decreasing the need for computing power at the receiver and increasing the quality of the display.

In another embodiment of the present invention, the formulated suggestion includes a suggestion to alter audio channel characteristics. As an example, but not the only example, assume that the quality of the display is degraded due to memory constraints at the receiver. The formulated suggestion can then include a suggestion that the sender decrease the number of audio channels broadcast, thereby decreasing the need for computing power at the receiver and increasing the quality of the display.

In another embodiment of the present invention, the formulated suggestion includes a suggestion to alter the graphics hardware load. In another embodiment of the present invention, the formulated suggestion includes a suggestion to alter the CPU load or the RAM amount available.

Figure 5:
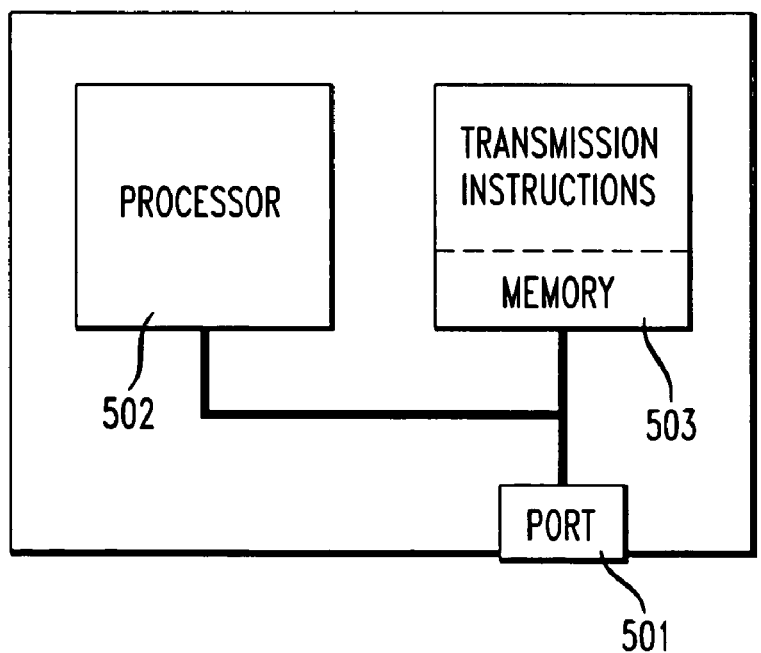
FIG. 5 is a pictorial representation of another apparatus according to one embodiment of the present invention.

FIG. 5 is a pictorial representation of an embodiment of the present invention. In one embodiment of the present invention, port 501 is coupled to processor 502, and memory 503 is coupled to port 501 and processor 502. Memory 503 contains transmission instructions adapted to be run on the processor to transmit data to a receiver, receive a suggestion to alter the transmitted data, and then decide to alter the transmitted data.

In one embodiment of the present invention, the received suggestion includes timing information identifying the point in time where the data was collected, and timing information identifying the point in time when the suggested action should be honored. In another embodiment of the present invention, the received suggestion includes a suggestion to alter the rate at which frames are transmitted for display. In another embodiment of the present invention, the received suggestion includes a suggestion to alter the color depth. In another embodiment of the present invention, the received suggestion includes a suggestion to alter the window size. As an example, but not the only example, assume that the displayed scene covers the entire screen, but because of limited memory, the quality of the display is degraded. The received suggestion can include a suggestion to reduce the size of the display, thereby decreasing the need for computing power at the receiver and increasing the quality of the display.

In another embodiment of the present invention, the received suggestion includes a suggestion to alter audio channel characteristics. As an example, but not the only example, assume that the quality of the display is degraded due to memory constraints at the receiver. The received suggestion can then include a suggestion that the sender decrease the number of audio channels broadcast, thereby decreasing the need for computing power at the receiver and increasing the quality of the display.

In another embodiment of the present invention, the received suggestion includes a suggestion to alter the graphics hardware load. In another embodiment of the present invention, the received suggestion includes a suggestion to alter the CPU load or the RAM amount available.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A computer-readable medium storing instructions adapted to be executed on a processor to:
   (a) display, at a receiver, received data;
   (b) analyze, by the receiver, parameters associated with the quality of the displayed data;
   (c) formulate, by the receiver and based on the analysis in step (b), a media-parameter suggestion for an encoder to alter the characteristics of data to be sent to the receiver; and
   (d) send, from the receiver, the formulated suggestion.

2. The computer-readable medium of claim 1, further storing instructions adapted to be executed on a processor to:
   (e) receive, at the receiver, a user preference to be used in the analysis in step (b).

3. The computer-readable medium of claim 2, wherein the instruction (a) to display data includes instructions adapted to be executed by a processor to display, at the receiver, audiovisual data.

4. The computer-readable medium of claim 2, wherein the instruction (b) to analyze parameters associated with the quality of the displayed data includes instructions adapted to be run on the processor to analyze, at the receiver, the system load.

5. The computer-readable medium of claim 2, wherein the instruction (b) to analyze parameters associated with the quality of the displayed data includes instructions adapted to be run on the processor to:
   (i) analyze, at the receiver, component load, wherein a component is chosen from the set comprising a central-processing unit, a graphics card, and a texture-mapping engine.

6. The computer-readable medium of claim 2, wherein the instruction (c) to formulate a media-parameter suggestion includes instructions adapted to be run on the processor to formulate media-parameter suggestions that include:
   (i) send timing information identifying the point in time where the data was collected; and
   (ii) send timing information identifying the point in time when the suggested action should be honored.

7. The computer-readable medium of claim 2, wherein the instruction (c) to formulate a media-parameter suggestion includes instructions adapted to be run on the processor to formulate media-parameter suggestions to:
   (i) alter the frame rate.

8. The computer-readable medium of claim 2, wherein the instruction (c) to formulate a media-parameter suggestion includes instructions adapted to be run on the processor to formulate media-parameter suggestions to:
   (i) alter the color depth.

9. The computer-readable medium of claim 2, wherein the instruction (c) to formulate a media-parameter suggestion includes instructions adapted to be run on the processor to formulate media-parameter suggestions to:
   (i) alter the window size.

10. The computer-readable medium of claim 2, wherein the instruction (c) to formulate a media-parameter suggestion includes instructions adapted to be run on the processor to formulate media-parameter suggestions to
    (i) alter audio channel characteristics.

11. The computer-readable medium of claim 2, wherein the instructions (c) to formulate a media-parameter suggestion includes instructions adapted to be run on the processor to formulate media-parameter suggestions to:
    (i) alter the graphics hardware load.

12. The computer-readable medium of claim 2, wherein the instructions (c) to formulate a media-parameter suggestion includes instructions adapted to be run on the processor to formulate media-parameter suggestions to:
    (i) alter the CPU load.

13. The computer-readable medium of claim 2, wherein the instruction (c) to formulate a media-parameter suggestion includes instructions adapted to be run on the processor to formulate media-parameter suggestions that include:
(i) altering the RAM amount available.

14. A method of transmitting data from a sender to a receiver across a network comprising:
(a) displaying, at the receiver, received data;
(b) analyzing, by the receiver, parameters associated with the quality of the displayed data;
(c) formulating, by the receiver and based on the analysis in step (b), a media-parameter suggestion for an encoder to alter the characteristics of data to be sent to the receiver; and
(d) sending, from the receiver, the formulated suggestion to alter the quality of the received data.

15. The method of claim 14, further comprising:
(e) receiving, at the receiver, a user preference to be used in the analysis in step (b).

16. The method of claim 15, wherein the displayed data is audiovisual data.

17. The method of claim 15 wherein said analyzing step (b) is based on system load.

18. The method of claim 15 wherein said analyzing step (b) is based on component load, where a component is chosen from the set comprising central-processing unit, graphics, card and texture mapping engine.

19. The method of claim 15 wherein the formulated suggestion includes:
(i) timing information identifying the point in time where the data was collected; and
(ii) timing information identifying the point in time when the suggested action should be honored.

20. The method of claim 15, wherein the formulated suggestion includes a suggestion to:
(i) alter the frame rate.

21. The method of claim 15, wherein the formulated suggestion includes a suggestion to:
(i) alter the color depth.

22. The method of claim 15, wherein the formulated suggestion includes a suggestion to:
(i) alter the window size.

23. The method of claim 15, wherein the formulated suggestion includes a suggestion to:
(i) alter audio channel characteristics.

24. The method of claim 15, wherein the formulated suggestion includes a suggestion to:
(i) alter the graphics hardware load.

25. The method of claim 15, wherein the formulated suggestion includes a suggestion to:
(i) alter the CPU load.

26. The method of claim 15, wherein the formulated suggestion includes a suggestion to:
(i) alter the RAM amount available.

27. A method for transmitting data across a network comprising:
(a) transmitting data to a receiver;
(b) receiving from the receiver a suggestion to alter future transmitted data on the basis of a quality of data transmitted in (a), wherein the suggestion is generated by the receiver based on a receiver analysis of data quality at the receiver;
(c) selecting, based on the received suggestion, an action to alter the data; and
(d) altering the future transmitted data.

28. The method of claim 27, wherein the data transmitted in step (a) includes audiovisual data.

29. The method of claim 27, wherein the received suggestion includes:
(i) timing information identifying the point in time where the data was collected; and
(ii) timing information identifying the point in time when the suggested action should be honored.

30. The method of claim 27, wherein the received suggestion includes:
(i) altering the frame rate.

31. The method of claim 27, wherein the received suggestion includes:
(i) altering the color depth.

32. The method of claim 27, wherein the received suggestion includes:
(i) altering the window size.

33. The method of claim 27, wherein the received suggestion includes:
(i) altering the audio channel characteristics.

34. The method of claim 27, wherein the received suggestion includes:
(i) altering the graphics hardware load.

35. The method of claim 27, wherein the received suggestion includes:
(i) altering the CPU load.

36. An apparatus for transmitting data from a sender to a receiver across a network comprising:
(a) a processor;
(b) a port coupled to said processor; and
(c) a memory coupled to said processor and said port, storing instructions adapted to be run on said processor to:
i. display, at the receiver, received data;
ii. analyze, by the receiver, parameters associated with the quality of the displayed data;
iii. formulate, by the receiver and based on the analysis in (ii), a media-parameter suggestion for an encoder to alter the characteristics of data to be sent to the receiver; and
iv. send, from the receiver, the formulated suggestion to alter the quality of the received data.

37. The apparatus in claim 36, wherein the memory further stores instructions adapted to be run on said processor to:
(v) receive, at the receiver, a user preference to be used in the analysis in (ii).

38. The apparatus in claim 36, wherein the formulated suggestion includes timing information identifying when the data was collected, and timing information identifying when the suggested action should be honored.

39. The apparatus in claim 36, wherein the formulated suggestion includes a suggestion to later the frame rate.

40. The apparatus in claim 36, wherein the formulated suggestion includes a suggestion to later the color depth.

41. The apparatus in claim 36, wherein the formulated suggestion includes a suggestion to alter the window size.

42. The apparatus in claim 36, wherein the formulated suggestion includes a suggestion to alter the audio characteristics.

43. The apparatus in claim 36, wherein the formulated suggestion includes a suggestion to alter the hardware load.

44. The apparatus in claim 36, wherein the formulated suggestion includes a suggestion to alter the CPU load.

45. The apparatus in claim 36, wherein the formulated suggestion includes a suggestion to alter the RAM amount available.

46. An apparatus for transmitting data from a sender to a receiver to a receiver across a network comprising:
  (a) a processor;
  (b) a port coupled to said processor; and
  (c) a memory coupled to said processor and said port, storing instructions adapted to be run on said processor to:
    (i) transmit data to a receiver;
    (ii) receive, from the receiver, a suggestion to alter future transmitted data on the basis of a quality of data transmitted in (i), wherein the suggestion is generated by the receiver based on a receiver analysis of data quality at the receiver;
    (iii) select, based on the received suggestion, an action to alter the future transmitted data; and
    (iv) alter the transmitted data.

47. The apparatus in claim 46, wherein the received suggestion includes timing information identifying when the data was collected, and timing information identifying when the suggested action should be honored.

48. The apparatus of claim 46, wherein the received suggestion includes altering the frame rate.

49. The apparatus of claim 46, wherein the received suggestion includes altering the color depth.

50. The apparatus of claim 46, wherein the received suggestion includes altering the window size.

51. The apparatus of claim 46, wherein the received suggestion includes altering audio channel characteristics.

52. The apparatus of claim 46, wherein the received suggestion includes altering the hardware load.

53. The apparatus of claim 46, wherein the received suggestion includes altering the CPU load.

* * * * *